United States Patent
Kim et al.

(10) Patent No.: US 11,144,068 B2
(45) Date of Patent: Oct. 12, 2021

(54) VEHICLE PLATOONING FORMATION CONTROLLER, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Jin Kim, Suwon-si (KR); Tae Hoon Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 232 days.

(21) Appl. No.: 16/189,500

(22) Filed: Nov. 13, 2018

(65) Prior Publication Data

US 2020/0073408 A1 Mar. 5, 2020

(30) Foreign Application Priority Data

Sep. 3, 2018 (KR) .................. 10-2018-0104659

(51) Int. Cl.
*G05D 1/02* (2020.01)

(52) U.S. Cl.
CPC ......... *G05D 1/0295* (2013.01); *G05D 1/0217* (2013.01)

(58) Field of Classification Search
CPC ............. G05D 1/0295; G05D 1/0217
See application file for complete search history.

(56) References Cited

U.S. PATENT DOCUMENTS

| | | | |
|---|---|---|---|
| 8,812,224 B1* | 8/2014 | Heitmann | G01C 22/00 701/123 |
| 2012/0176231 A1* | 7/2012 | Skaff | B60K 35/00 340/439 |
| 2014/0121933 A1* | 5/2014 | Slaton | B60W 50/085 701/93 |
| 2016/0052397 A1* | 2/2016 | Meyer | B60L 58/12 701/22 |
| 2018/0113448 A1* | 4/2018 | Nagda | G05D 1/0293 |
| 2018/0211663 A1* | 7/2018 | Shin | G10L 15/1815 |
| 2018/0258897 A1* | 9/2018 | Leone | F02N 11/0851 |
| 2018/0315256 A1* | 11/2018 | Weber | G01C 21/3697 |
| 2018/0350366 A1* | 12/2018 | Park | G10L 15/30 |
| 2019/0080373 A1* | 3/2019 | Takoshima | G05D 1/0088 |
| 2019/0171227 A1* | 6/2019 | Sujan | B60W 10/06 |

* cited by examiner

*Primary Examiner* — Jess Whittington
(74) *Attorney, Agent, or Firm* — Lempia Summerfield Katz LLC

(57) ABSTRACT

A platooning controller includes a processor configured to control platooning based on platooning control vehicle information when platooning vehicles, including one leader vehicle and at least one or more following vehicles, are traveling. The platooning controller is further configured to monitor information associated with an energy state of each of the platooning vehicles while platooning, and to adjust a platoon formation based on a change in the energy state of each of the platooning vehicles. The platooning controller further includes a storage configured to store information obtained to adjust the platoon formation by the processor.

18 Claims, 11 Drawing Sheets

FIG. 9

| PLATOONING CONTROL VEHICLE INFORMATION | | EXAMPLE |
|---|---|---|
| (A) | THE NUMBER OF VEHICLES WHICH PARTICIPATE IN PLATOONING | 4 |
| (B) | DISTANCE NECESSARY FOR TOTAL DRIVING | 500Km |
| (C) | DISTANCE NECESSARY FOR REMAINING DRIVING | 200Km |
| (D) | DEPARTURE POINT | PAJU |
| (E) | DESTINATION POINT | GEOJEDO |
| (F) | CURRENT LOCATION | BOSEONG |
| (G) | ROAD INFORMATION | — |
| (H) | FORMATION INFORMATION LIST | |

812 — FORMATION INFORMATION LIST(3)

| | | FIRST VEHICLE LV | SECOND VEHICLE FV1 | THIRD VEHICLE FV2 | FOURTH VEHICLE FV3 |
|---|---|---|---|---|---|
| (I) | PT INFORMATION | GASOLINE | GASOLINE | DIESEL | DIESEL |
| (J) | CURRENT RETENTION ENERGY | 25 liter | 24.5 liter | 21 liter | 18.5 liter |
| (K) | DRIVABLE DISTANCE | 274Km | 288Km | 262Km | 246Km |
| (L) | ENERGY NECESSARY PER DISTANCE (ACCUMULATION OF ENTIRE VEHICLE DRIVING) | 0.085liter/km | 0.082liter/km | 0.076liter/km | 0.071liter/km |
| (M) | ENERGY NECESSARY PER DISTANCE (CURRENT PLATOONING SITUATION) | 0.091liter/km | 0.085liter/km | 0.080liter/km | 0.075liter/km |

UPDATE ENERGY NECESSARY PER DISTANCE AND DRIVABLE DISTANCE BASED ON REAL DRIVING

813 — FORMATION INFORMATION LIST(4)

| | | FIRST VEHICLE LV | SECOND VEHICLE FV1 | THIRD VEHICLE FV2 | FOURTH VEHICLE FV3 |
|---|---|---|---|---|---|
| (I) | PT INFORMATION | GASOLINE | GASOLINE | DIESEL | DIESEL |
| (J) | CURRENT RETENTION ENERGY | 24.5 liter | 25 liter | 21 liter | 18.5 liter |
| (K) | DRIVABLE DISTANCE | 281Km | 280Km | 262Km | 246Km |
| (L) | ENERGY NECESSARY PER DISTANCE (ACCUMULATION OF ENTIRE VEHICLE DRIVING) | 0.082liter/km | 0.085liter/km | 0.076liter/km | 0.071liter/km |
| (M) | ENERGY NECESSARY PER DISTANCE (CURRENT PLATOONING SITUATION) | 0.087liter/km | 0.089liter/km | 0.080liter/km | 0.075liter/km |

ENERGY NECESSARY PER DISTANCE IS CHANGED AND DRIVABLE DISTANCE IS INCREASED, THROUGH CHANGE IN FORMATION OF FIRST VEHICLE LV AND SECOND VEHICLE FV1

FIG. 10

VEHICLE PLATOONING FORMATION CONTROLLER, SYSTEM INCLUDING THE SAME, AND METHOD THEREOF

CROSS-REFERENCE TO RELATED APPLICATION

This application is based on and claims the benefit of priority to Korean Patent Application No. 10-2018-0104659, filed in the Korean Intellectual Property Office on Sep. 3, 2018, the entire disclosure of which is incorporated herein by reference.

TECHNICAL FIELD

The present disclosure relates to a platooning controller, a system including the same, and a method thereof, and more particularly, relates to technologies for increasing a cruising range of platooning vehicles.

BACKGROUND

If autonomous vehicles become commercialized, drivers may be able to enjoy the benefits of having a driverless vehicle such as being able to drink tea, take a nap, or do work in the vehicle rather than driving the vehicle. Traffic accidents caused from the driver's distractions may also be reduced. In addition, autonomous vehicles have been found to provide great mileage savings by identifying the optimal route and maximizing mileage.

Where such autonomous vehicles may be first introduced is in platooning. In the case of the logistics industry, freighting goods from a central distribution point to the final destination point is usually regarded as a field which is most complicated and expensive in distribution and electronic commerce delivery. Companies of the current logistics industry attempt to improve package transportation, delivery liberalization, and the like by applying autonomous systems to small electric trucks. Technologies of such autonomous vehicles are expected to gradually expand to personal transportation as well as to logistics transportation.

Current vehicles have spatial constraints on width, length, and height due to road characteristics. There are constraints on the number of passengers who ride in one vehicle and on the logistics capable of being loaded into one vehicle. As a result, when a plurality of persons or when a large amount of logistics is required to move to a destination point, the platooning of autonomous vehicles is the best option.

Conventional platooning works best if there are two or more vehicles leaving from the same departure point and arriving at the same destination point. If, for example, the arrival destination of any of the vehicles in the platoon is not the same, the platooning efficiency might be affected.

In other words, determining a platoon formation and performing platooning without taking into consideration the characteristics and destination of each of the platooning vehicles may result in a decline in the efficiency of the platooning vehicles.

SUMMARY

The present disclosure is directed to solving the above-described problems of the related art while advantages achieved by the prior art are maintained intact.

The present disclosure is directed to a technology capable of increasing a cruising range of platooning vehicles. The present disclosure provides a platooning controller for increasing the entire cruising range of platooning vehicles by adjusting a platoon formation based on a change in the energy state between platooning vehicles and by minimizing the movement time of all the platooning vehicles by minimizing the amount of energy that needs to be supplied to the platooning vehicles while traveling and the number of times in supplying energy to the platooning vehicles. The present disclosure also provides a system including the same, and a method thereof.

The technical problems to be solved by the present disclosure are not limited to the aforementioned problems. Any other technical problems not mentioned herein will become apparent to those of ordinary skill in the art from the following description.

According to an aspect of the present disclosure, a platooning controller may include a processor configured to control platooning based on platooning control vehicle information when platooning vehicles, including one leader vehicle and at least one or more following vehicles, are traveling. The processor may be further configured to monitor information associated with an energy state of each of the platooning vehicles while platooning, and to adjust a platoon formation based on a change in the energy state of each of the platooning vehicles. The platooning controller may further include a storage configured to store information obtained to adjust the platoon formation by the processor.

The processor may be configured to, when loaded into the one leader vehicle, generate a platooning control vehicle information table including the platooning control vehicle information collected from the at least one or more following vehicles and the platooning control vehicle information of the leader vehicle.

The platooning control vehicle information table may include at least one or more of the number of the platooning vehicles which participate in platooning, a distance necessary for total driving to a destination point, a distance necessary for remaining driving, a source point, the destination point, a current location, road information and a formation information list.

The formation information list may include at least one or more of vehicle fuel information for each platooning vehicle, current retention energy information for each platooning vehicle, a drivable distance for each platooning vehicle, energy necessary per distance based on accumulation of the entire vehicle driving for each platooning vehicle, and energy necessary per distance based on a current platooning situation for each platooning vehicle.

The road information may include at least one or more of a road type, weather, temperature, and traffic information.

The processor may be configured to calculate a drivable distance of a host vehicle using retention energy of the host vehicle and energy necessary per distance based on accumulation of the entire host vehicle driving.

The processor may be configured to, when loaded into at least one or more following vehicles, transmit the platooning control vehicle information, including a drivable distance of the host vehicle, vehicle fuel information of the host vehicle, current retention energy of the host vehicle, and energy necessary per distance based on accumulation of the entire host vehicle driving, to the leader vehicle when receiving a request to transmit the platooning control vehicle information from the leader vehicle.

The processor may be configured to compare drivable distances of the platooning vehicles and determine the platoon formation based on the drivable distances.

The processor may be configured to monitor a change in road information and recalculate the drivable distances based on the change in road information.

The processor may be configured to, after the platooning starts, recalculate the drivable distances using current retention energy of each of the platooning vehicles and energy necessary per distance based on a current platooning situation of each of the platooning vehicles.

The processor may be configured to, when loaded into the one leader vehicle, compare a drivable distance recalculated for each platooning vehicle with a distance necessary for remaining distance to a destination point. When there is a vehicle where the recalculated drivable distance is shorter than the distance necessary for the remaining driving, the processor may be further configured to move the vehicle where the recalculated drivable distance is shorter than the distance necessary for the remaining driving to the tail end of the platoon formation and provide a path to a place for energy supply to the vehicle where the recalculated drivable distance is shorter than the distance necessary for the remaining driving.

The processor may be configured to, when loaded into the one leader vehicle, compare a drivable distance recalculated for each platooning vehicle with a distance necessary for remaining driving to a destination point. The processor may be further configured to adjust the platoon formation based on the drivable distance, when the drivable distance recalculated for each platooning vehicle is longer than the distance necessary for the remaining driving.

The processor may be configured to determine whether a drivable coefficient obtained by dividing the drivable distance recalculated for each platooning vehicle by the distance necessary for the remaining driving to the destination point is greater than or equal to a predetermined reference value. The processor may be further configured to adjust the platoon formation based on a criterion in which energy necessary per distance based on a current platooning situation of each of all the platooning vehicles is minimal, when the drivable coefficient is greater than or equal to the reference value.

The processor may be configured to adjust the platoon formation in the order that the drivable distance recalculated for each platooning vehicle is longer, when the drivable coefficient is less than the reference value.

According to another aspect of the present disclosure, a vehicle system may include a vehicle-to-everything (V2X) communication module configured to perform communication between platooning vehicles when the platooning vehicles, including one leader vehicle and at least one or more following vehicles, are traveling. The vehicle system may further include a platooning controller configured to control platooning based on platooning control vehicle information transmitted and received between the platooning vehicles. The platooning controller may also be configured to monitor information associated with an energy state of each of the platooning vehicles while platooning and to adjust a platoon formation based on a change in the energy state of each of the platooning vehicles.

According to another aspect of the present disclosure, a platooning control method may include receiving platooning control vehicle information from at least one or more following vehicles, when platooning vehicles, including one leader vehicle and the at least one or more following vehicles are traveling. The platooning control method may further include determining a platoon formation based on the received platooning control vehicle information and the platooning control vehicle information of a host vehicle. The platooning control method may also include monitoring information associated with an energy state of each of the platooning vehicles while platooning and adjusting the platoon formation based on a change in the energy state of each of the platooning vehicles.

The determining of the platoon formation may include determining the platoon formation based on a drivable distance of each of the platooning vehicles.

The adjusting of the platoon formation may include, after the platooning starts, recalculating the drivable distance using current retention energy of each of the platooning vehicles and energy necessary per distance based on a current platooning situation of each of the platooning vehicles. The adjusting of the platoon formation may further include comparing the drivable distance recalculated for each platooning vehicle with a distance necessary for a remaining driving to a destination point. The adjusting of the platoon formation may also include, when there is a vehicle where the recalculated drivable distance is shorter than the distance necessary for the remaining driving, moving the vehicle where the recalculated drivable distance is shorter than the distance necessary for the remaining driving to the tail end of the platoon formation and the adjusting of the platoon formation may also include providing a path to a place for energy supply to the vehicle where the recalculated drivable distance is shorter than the distance necessary for the remaining driving.

The adjusting of the platoon formation may further include, when the drivable distance recalculated for each platooning vehicle is longer than the distance necessary for the remaining driving, determining whether a drivable coefficient obtained by dividing the drivable distance recalculated for each platooning vehicle by the distance necessary for the remaining driving to the destination point is greater than or equal to a predetermined reference value.

The adjusting of the platoon formation may further include adjusting the platoon formation based on a criterion in which the energy necessary per distance based on a current platooning situation of each of the platooning vehicles is minimal, when the drivable coefficient is greater than or equal to the reference value. The adjusting of the platoon formation may also include adjusting the platoon formation in the order that the drivable distance recalculated for each platooning vehicle is longer, when the drivable coefficient is less than the reference value.

BRIEF DESCRIPTION OF THE DRAWINGS

The above and other objects, features and advantages of the present disclosure will be more apparent from the following detailed description taken in conjunction with the accompanying drawings:

FIG. 9 is a drawing illustrating a real platooning control vehicle information table of a platooning controller according to an embodiment of the present disclosure;

FIG. 10 is a drawing illustrating an example of increasing a vehicle cruising range of a platooning controller of FIG. 9.

DETAILED DESCRIPTION

Hereinafter, embodiments of the present disclosure are described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$ first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application.

Hereinafter, embodiments of the present disclosure are described in detail with reference to FIGS. 1 to 11.

Figure 1:
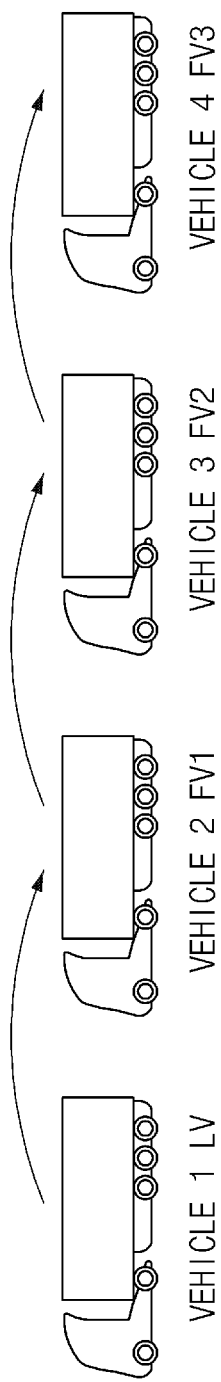
FIG. 1 is a drawing illustrating platooning among platooning vehicles according to an embodiment of the present disclosure.
Figure 2:
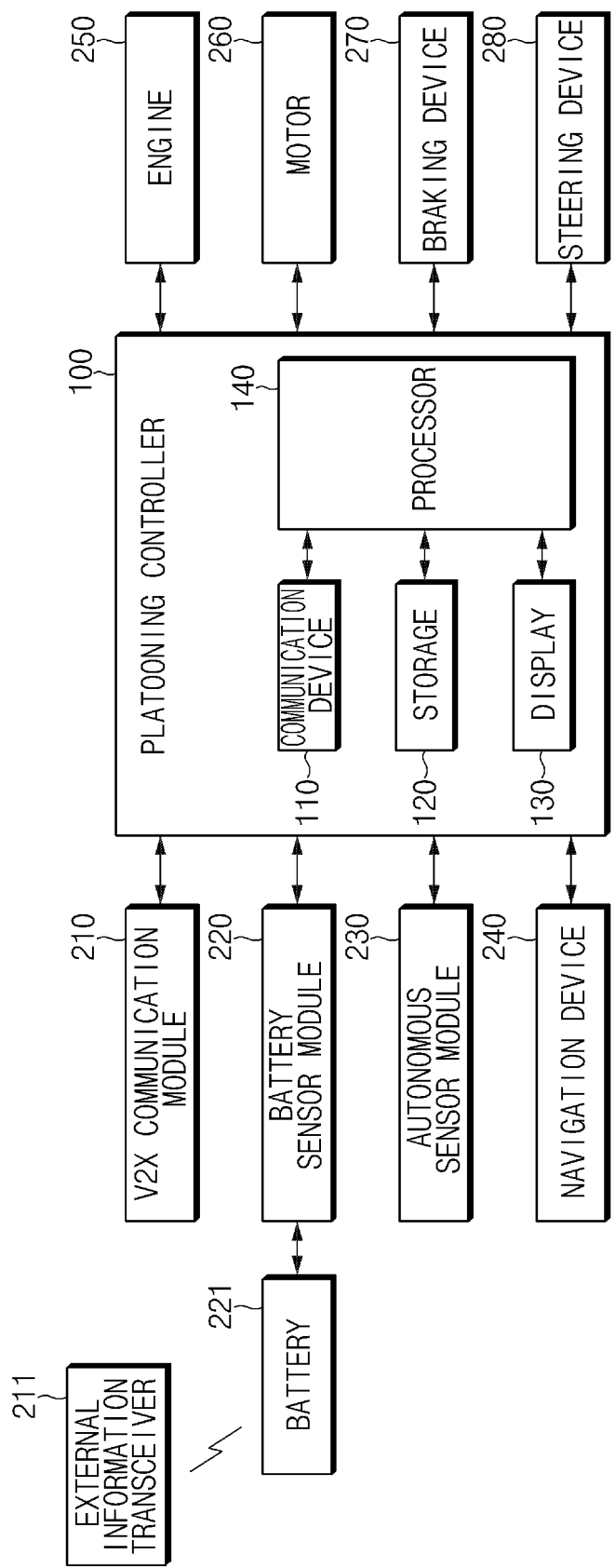
FIG. 2 is a block diagram illustrating a configuration of a vehicle system including a platooning controller according to an embodiment of the present disclosure.

FIG. 1 is a drawing illustrating platooning among platooning vehicles according to an embodiment of the present disclosure. FIG. 2 is a block diagram illustrating a configuration of a vehicle system including a platooning controller according to an embodiment of the present disclosure.

Referring to FIG. 1, a leader vehicle 1 or vehicle LV is traveling at the forefront while platooning. The following vehicles, including vehicle 2 or FV1, vehicle 3 For V2, and vehicle 4 or FV3 follow the leader vehicle LV platoon while mainlining a distance spaced apart from each other at a predetermined interval.

In the embodiment shown in FIG. 1, the platooning controller may monitor road information, an energy state of each vehicle, or the like and may change and adjust a platoon formation, such that all platooning vehicles arrive at a destination point simultaneously.

Referring to FIG. 2, a vehicle system according to an embodiment of the present disclosure may include a platooning controller 100, a vehicle-to-everything (V2X) communication module 210, a battery sensor module 220, an autonomous sensor module 230, a navigation device 240, an engine 250, a motor 260, a braking device 270, and a steering device 280. Such a vehicle system may be loaded into a vehicle. The vehicle system may be loaded into the leader vehicle LV and each of the following vehicles FV1, FV2, and FV3 of FIG. 1. In this embodiment, an external information transceiver 211 disposed outside the vehicle may be installed in a facility around a road, another vehicle, a traffic information center, or the like.

The platooning controller 100 may control platooning based on platooning control vehicle information transmitted and received between platooning vehicles. The platooning controller 100 may monitor information associated with an energy state of the platooning vehicles while platooning and may adjust a platoon formation based on a change in the energy state of each of the platooning vehicles. In this embodiment, the energy state of each of the platooning vehicles may vary with a mileage, a variation in persons who ride in each platooning vehicle, a variation in cargo capacity, usage of energy consumption in each platooning vehicle such as air-conditioning or a seat, a traffic situation, or the like.

To this end, the platooning controller 100 may include a communication device 110, a storage 120, a display 130, and a processor 140.

The communication device 110 may be a communication gateway of the vehicle. The communication device 110 may convert data of heterogeneous communication networks, such as a local interconnect network (LIN), a controller area network (CAN), and an ethernet, or data of heterogeneous protocols through CAN communication or the like. The communication device 110 may further transmit and receive communication data between respective components (controllers) in the vehicle. Furthermore, the communication device 110 may communicate with the V2X communication module 210, the battery sensor module 220, the autonomous sensor module 230, the navigation device 240, the engine 250, the motor 260, the braking device 270, the steering device 280, or the like in the vehicle. Such a communication device 100 may be integrated with another device or component in the vehicle. A vehicle which does not have a gateway, may perform direction communication between respective controllers or may have a connection configuration in the form of hardware/wire.

The storage 120 may store information received from the V2X communication module 210, the battery sensor module 220, the autonomous sensor module 230, and the navigation device 240 in the vehicle. The information may be calculated by the processor 140, or the like. Particularly, the storage 120 may store a platooning control vehicle information table generated by the processor 140. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and optical disk.

The display 130 may display the platooning control vehicle information table generated by the processor 140.

The displayed vehicle information may include a platoon formation order, associated with platooning, or the like. The display 130 may be implemented as a head up display (HUD), a cluster, an audio video navigation (AVN), or the like independently of the platooning controller 100 Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display and a three-dimensional (3D) display. The display 130 may be implemented as a transparent display configured as a transparent type or a semi-transparent type to see the outside, Moreover, the display 130 may be implemented as a touchscreen including a touch panel to be used as an input device other than an output device.

The processor 140 may be electrically connected with the V2X communication module 210, the battery sensor module 220, the autonomous sensor module 230, the navigation device 240, the engine 250, the motor 260, the braking device 270, the steering device 280, or the like in the vehicle. The processor 140 may further be electrically connected with the communication device 110, the storage 120, and the display 130 and may electrically control the respective components. The processor 140 may be an electric circuit which executes instructions of software and may perform a variety of data processing and calculation described below.

The processor 140 may control platooning based on the platooning control vehicle information when platooning vehicles, including one leader vehicle and at least one or more following vehicles, are traveling. The processor 140 may monitor information associated with an energy state of each of the platooning vehicles while platooning and may adjust a platoon formation based on a change in the energy state of each of the platooning vehicles. In this embodiment, the processor 140 may periodically collect energy state information through communication with the following vehicles (e.g., 100 ms to 1 hour). The processor 140 may further update information of a host vehicle to a platooning control vehicle information table periodically.

The platooning controller 100 including the processor 140, may be loaded into the leader vehicle or each of the following vehicles. Hereinafter, a function of the processor 140 of the platooning controller 110 loaded into vehicle determined as the leader vehicle is described.

Figure 3:
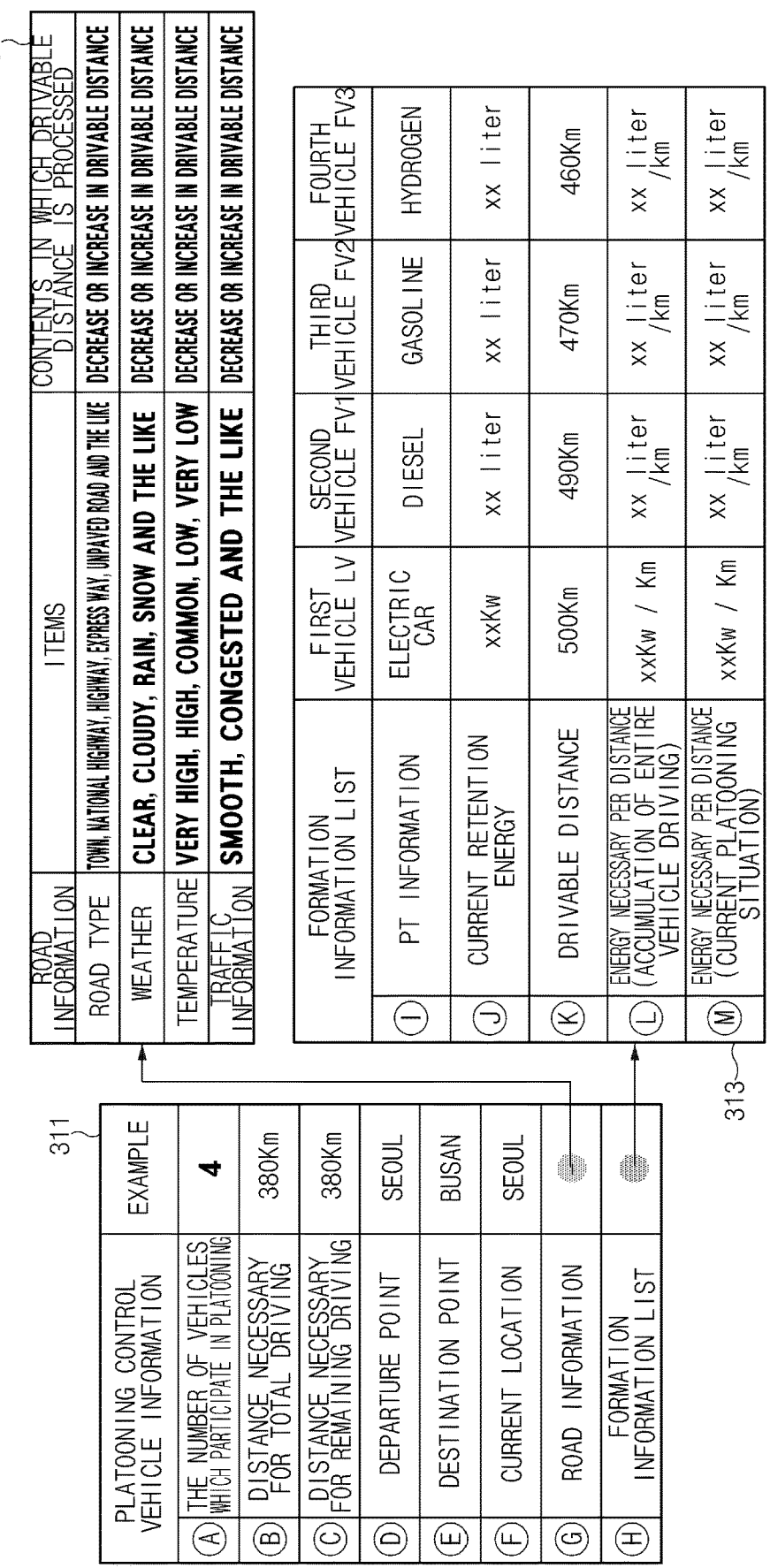
FIG. 3 is a drawing illustrating a platooning control vehicle information table according to an embodiment of the present disclosure.

The processor 140 may generate a platooning control vehicle information table including the platooning control vehicle information control collected from the following vehicles and the platooning control vehicle information of a host vehicle. FIG. 3 is a drawing illustrating a platooning control vehicle information table according to an embodiment of the present disclosure. Referring to FIG. 3, a platooning control vehicle information table 311 may include the number of vehicles which participate in platooning, a distance necessary for total driving, a distance necessary for remaining driving, a departure point, a destination point, a current location, road information, and a formation information list. In this embodiment, a platooning controller 100 of FIG. 2, loaded into a leader vehicle 1 LV of FIG. 1, may determine the number of vehicles which participate in platooning, a distance necessary for total driving, a distance necessary for remaining driving, a departure point, a destination point, and a current location using information received from a V2X communication module 210, an autonomous sensor module 230, or a navigation device 240 of FIG. 2. The platooning controller 100 may further obtain road information from the V2X communication module 210 and the navigation device 240. The V2X communication module 210 may receive road information from an external traffic center or a nearby vehicle. Furthermore, the platooning controller 100 loaded into the leader vehicle 1 LV may generate a formation information list of each platooning vehicle using the formation configuration information collected from each following vehicle.

In addition, the road information may be stored in a road information table 312 including a road type, weather, temperature, and traffic information. For example, the road type may be classified as a town, a national highway, highway, an expressway, whether there an unpaved road, or the like. A highway may increase the drivable distance, and an unpaved road may decrease the drivable distance. Furthermore, clear weather may increase the drivable distance, and rainy or snowy weather may decrease the drivable distance. A very high or low temperature may decrease the drivable distance, and an ordinary temperature may increase the drivable distance. Smooth traffic may increase the drivable distance, and congested traffic may decrease the drivable distance.

A formation information list 313 may include a vehicle type (PT information) for each of the platooning vehicles, a current retention energy, a drivable distance, an energy necessary per distance based on accumulation of the entire vehicle driving, and an energy necessary per distance based on a current platooning situation. The platooning control vehicle information table 311 of FIG. 3 may be generated and updated by the platooning controller 100 of the leader vehicle 1 LV.

In this embodiment, the processor 140 may know, as shown in the platooning control vehicle information table 311 of FIG. 3, the number of vehicles which participate in platooning, a distance necessary for total driving, a distance necessary for remaining driving, a departure point, a destination point, a current location, or the like. The processor 140 may receive a formation information list of each following vehicle from each following vehicle and may generate the initial platooning control vehicle information table 311. In this embodiment, to calculate a drivable distance of a formation information list at the beginning before platooning, the processor 140 of each platooning vehicle may calculate a drivable distance of a host vehicle using the retention energy of the host vehicle and the energy necessary per distance based on the accumulation of the entire host vehicle driving and may transmit the calculated drivable distance to the leader vehicle LV. In other words, the processor 140 of each platooning vehicle may calculate a drivable distance of the host vehicle at the beginning by dividing the intention energy of the host vehicle by the energy necessary per distance based on the accumulation of the entire host vehicle driving. Furthermore, the processor 140 may divide a stance from departure point to a destination point into several nodes, rather than a distance necessary for total driving, and may predict a drivable distance for each node.

The processor 140 may compare the drivable distances of the platooning vehicles and may determine a platoon formation based on the drivable distances. In other words, the processor 140 may determine a platoon formation in the order that the drivable distance is longer.

Figure 4:
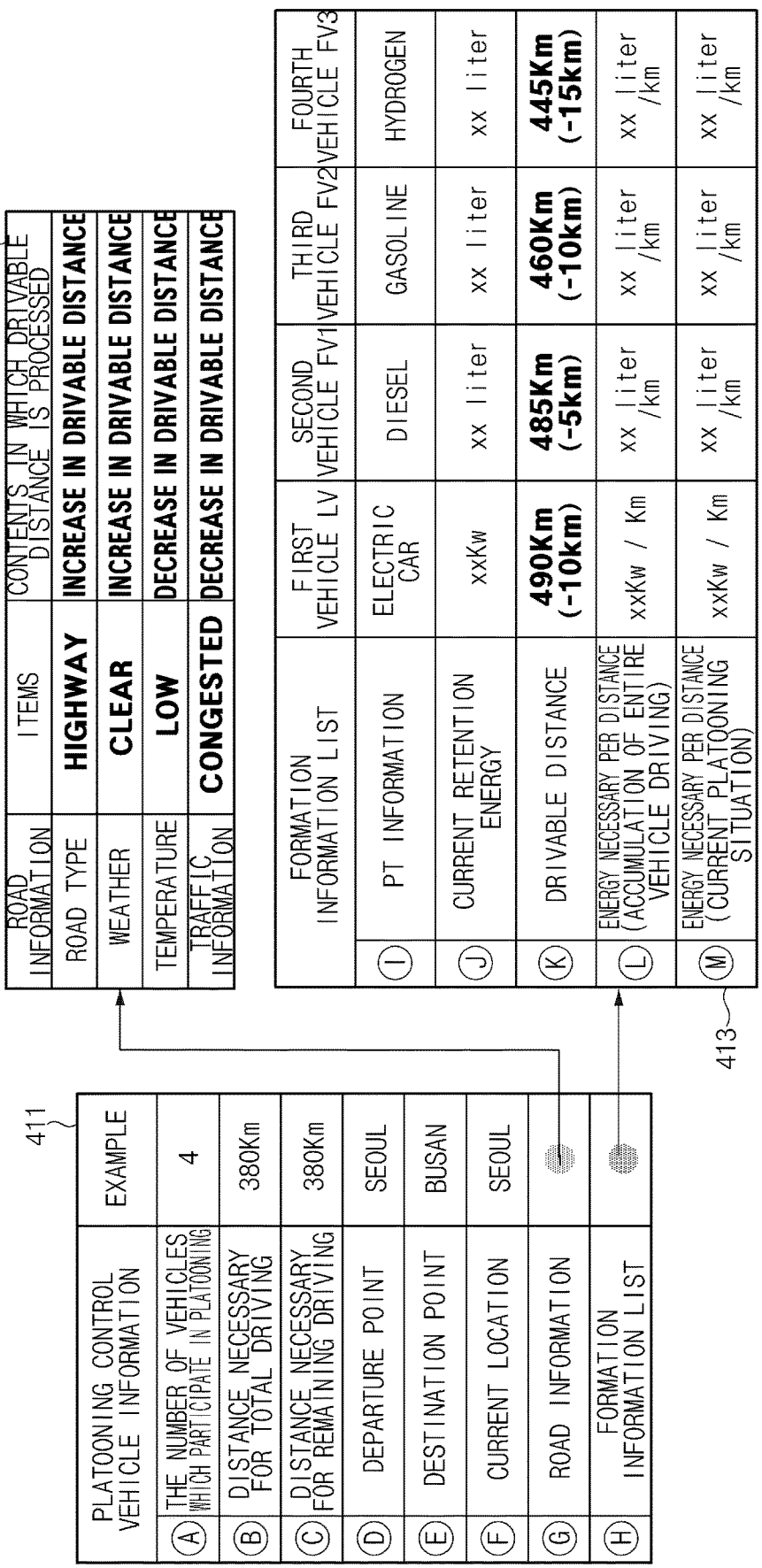
FIG. 4 is a drawing illustrating a platooning control vehicle information table in which a drivable distance is recalculated according to road information or an energy state of platooning vehicles according to an embodiment of the present disclosure.

The processor 140 may continue monitoring a change in the road information or change in an energy state of each of the platooning vehicles while platooning and may recalculate the drivable distance upon the change in the road information or the change in the energy state of each of the platooning vehicles. In this example, the processor 140 may receive the road information from an external traffic center or a nearby vehicle and may receive information associated with the energy state of each of the platooning vehicles at a predetermined period from the platooning vehicles. FIG. 4 is a drawing illustrating a platooning control vehicle information table in which a drivable distance is recalculated according to a road information or an energy state, according to an embodiment of the present disclosure. Referring to FIG. 4, when a road where platooning vehicles are traveling is a highway, when the weather is clear, when the temperature is low, and when the traffic is congested, in a road information table 412 included in a platooning control vehicle information table 411, a platooning controller 100 of FIG. 1 may recalculate the drivable distance. Thus, the platooning controller 100 of a leader vehicle LV may update the recalculated drivable distance to the formation information list 413 of the platooning control vehicle information table 411. In this embodiment, a processor 140 of FIG. 2 may recalculate the drivable distance on a periodic basis (e.g., 100 ms to 1 hour) and may update the platooning control vehicle information table 411.

Furthermore, when recalculating the drivable stance based on a change in the energy state, after platooning starts, the processor 140 may recalculate the drivable distance using the current retention energy of each of the platooning vehicles and the energy necessary per distance based on the current platooning situation of each of the platooning vehicles. In other words, the processor 140 may calculate the drivable distance of a host vehicle by dividing the retention energy of each of the platooning vehicles by the energy necessary per distance based on the current platooning situation.

The processor 140 may compare the drivable distance recalculated for each platooning vehicle with a distance necessary for remaining driving to a destination point. When there is a vehicle where the recalculated drivable distance is shorter than the distance necessary for the remaining driving, the processor 140 may move the vehicle where the recalculated drivable distance shorter than the distance necessary for the remaining driving to the tail end of a platooning formation and may provide a route to a place (e.g., a gas station, a charging station, or the like) for energy supply to the vehicle where the recalculated drivable distance is shorter than the distance necessary for the remaining driving.

Figure 5:
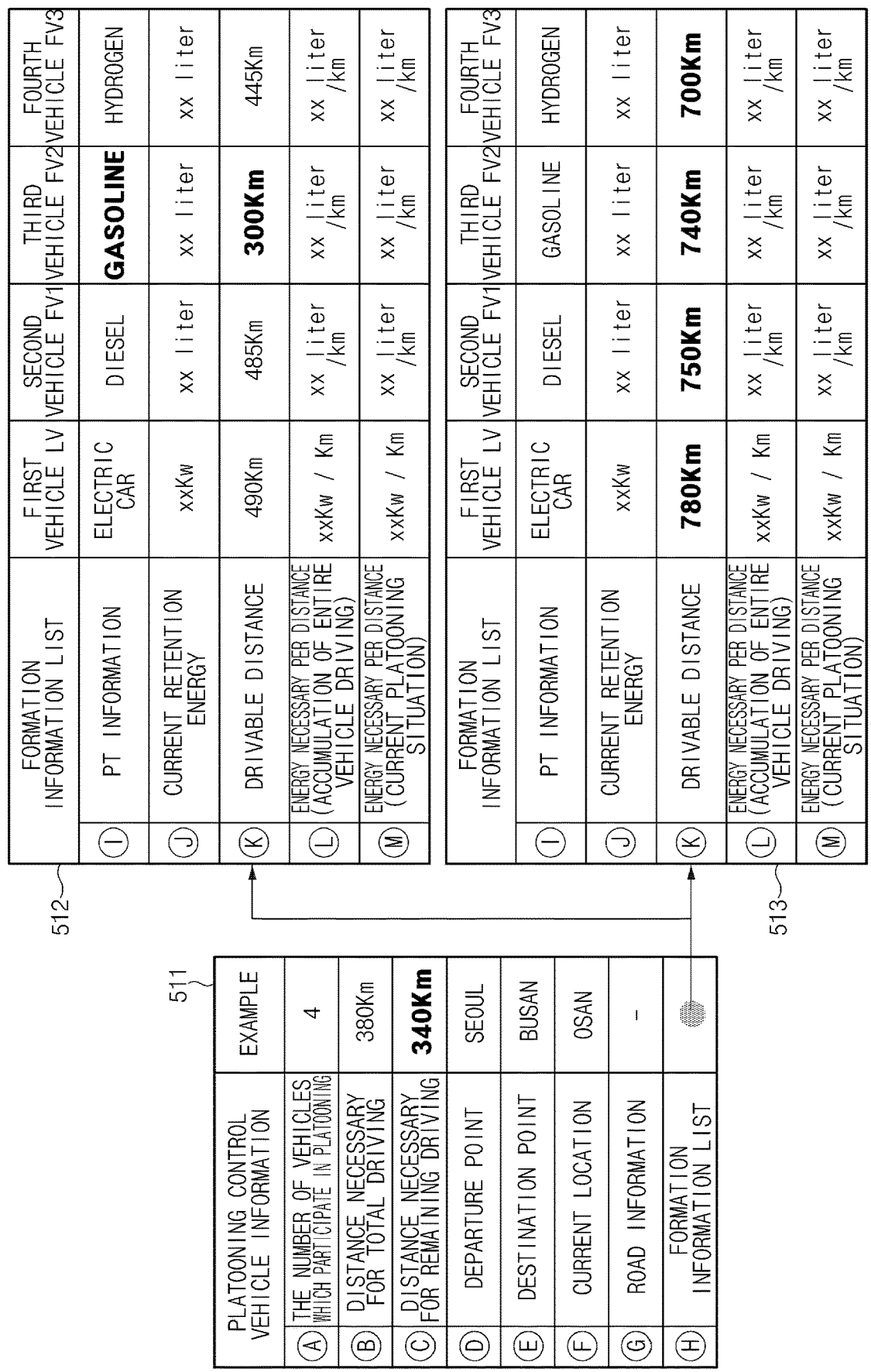
FIG. 5 is a drawing illustrating a platooning control vehicle information table when a drivable distance is shorter than a distance necessary for the remaining driving, according to an embodiment of the present disclosure.

The processor 140 may compare the drivable distance recalculated for each platooning vehicle with the distance necessary for the remaining driving to a destination point. When the drivable distance recalculated for each platooning vehicle is longer than the distance necessary for the remaining driving, the processor 140 may adjust a platoon formation based on the drivable distance. In other words, the processor 140 may adjust an order of the formation of the vehicles using the drivable distances. The platoon formation may be arranged in descending order from the platooning vehicle with the longest drivable distance to the platooning vehicle with the shortest drivable instance. FIG. 5 is a drawing illustrating a platooning control vehicle information table when a drivable distance is shorter than a distance necessary for the remaining driving, according to an embodiment of the present disclosure. Referring to a platooning control vehicle information table 511 of FIG. 5, compared with an initial platooning control vehicle information table 311 of FIG. 3, a current location changes from "Seoul" to "Osan" after platooning starts and a distance necessary for remaining driving decreases from "380 km" to "340 km".

In this embodiment, a platooning controller 100 of leader vehicle 1 LV may calculate a drivable distance based on an energy state of each of following vehicles FV1, FV2, and FV3, received from each of the following vehicles FV1, FV2, and FV3. Since a drivable distance of the third vehicle FV2 decreases in tie formation information of FIG. 5, the drivable distance of the third vehicle FV2 is shorter than the distance necessary for remaining driving. In other words, it is difficult for the third vehicle to reach the destination point in the current energy state. A formation information list 513 may be an example in which all the drivable distances of the platooning vehicles LV, FV1, FV2, and FV3 are sufficiently longer than the distance necessary for the remaining distance.

A processor 140 of FIG. 2 may determine whether a drivable coefficient obtained by dividing the drivable distance recalculated for each platooning vehicle by the distance necessary for the remaining driving to a destination point is greater than or equal to a predetermined reference value. When the drivable coefficient is greater than or equal to the reference value, the processor 140 may adjust a platoon formation based on a criterion where the energy necessary per distance based on the current platooning situation of each of all the platooning vehicles is minimal.

Figure 6:
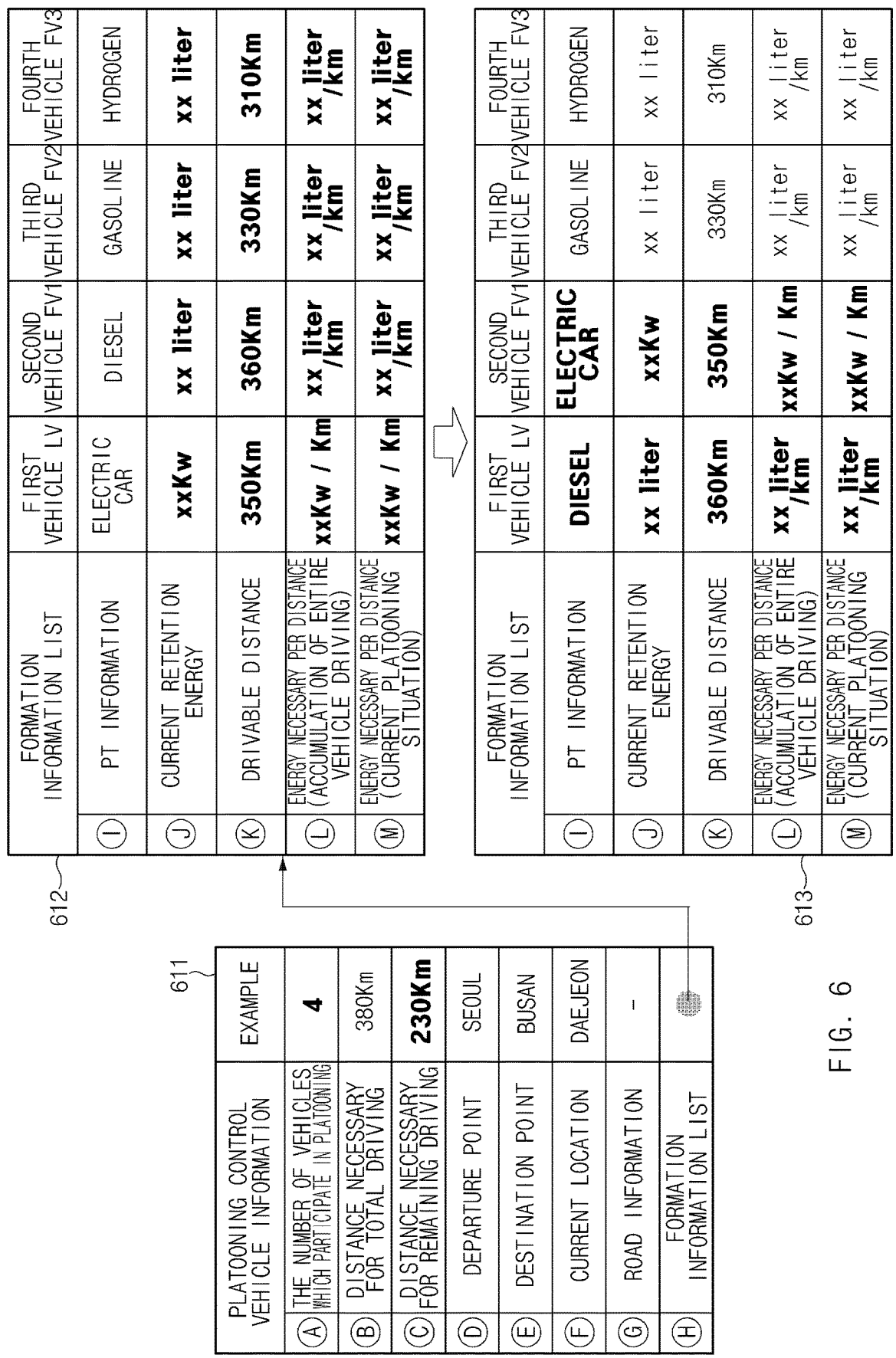
FIG. 6 is a drawing illustrating a platooning control vehicle information table indicating an example of changing a formation order based on a change in the drivable distance, according to an embodiment of the present disclosure.

When the drivable coefficient is less than the reference value, the processor 140 may adjust the platoon formation order of the vehicles using the drivable distances recalculated for each platooning vehicle. The platoon formation may be arranged in descending order from the platooning vehicle with the longest drivable distance to the platooning vehicle with the shortest drivable distance. In this embodiment, the processor 140 may determine a formation change based on the drivable distance including a margin value (e.g., a drivable distance of 5 Km or more to avoid a frequent formation change. FIG. 6 is a drawing illustrating a platooning control vehicle information table indicating an example of changing a formation order based on a change in the drivable distance, according to an embodiment of the present disclosure. Referring to a platooning control vehicle information table 611 of FIG. 6, compared with a platooning control vehicle information table 511 of FIG. 5, it may be seen that, since a predetermined time elapses after a vehicle travels, a current location changes from "Osan" to "Daejeon" and that a distance necessary for a remaining driving decreases from "340 km" to "230 km".

In this example, referring to a formation information list 612, a drivable distance according to a current energy state of each of the current platooning vehicles is 350 km in a first vehicle LV, 360 km in a second vehicle FV1, 330 km in a third vehicle FV2, and 310 km in a fourth vehicle FV3. In this embodiment, the drivable distance of the second vehicle FV1 is longer than the drivable distance of the first vehicle LV. Thus, like the formation information list 613, since the formation of the first vehicle LV and the second vehicle FV1 is changed, the second vehicle becomes the leader vehicle. As such, when the formation is changed, the processor 140 may notify the platooning vehicles that the formation is changed. Furthermore, when the leader vehicle is changed due to the change in formation, the processor 140 loaded into the newly specified leader vehicle may continue generating a platooning control vehicle information table, monitoring an energy state of each platooning vehicle, and recalculating the drivable distance according to the energy state of each platooning vehicle.

The processor 140 may be divided and configured into a drive system controller for controlling the behavior of a vehicle, such as an engine 250, a motor 260, a braking device 270, and a steering device 280 of FIG. 2, and a platooning controller for controlling platooning. In other words, the processor 140 may perform calculation for controlling platooning and may control the engine 250, the motor 260, and the braking device 270, and the steering device 280 for platooning to control the behavior of the vehicle.

In FIG. 2, an embodiment is depicted with the vehicle having the engine 250 and the motor 260. However, embodiments are not limited thereto. For example, a vehicle may only have the engine 250 or only the motor 260, based on a vehicle fuel type (PT information). In other words, an electric car may have only the motor 260. A fuel vehicle may have only the engine 250. A hybrid vehicle may have both the engine 250 and the motor 260.

The processor 140 may obtain information from an external infrastructure and the vehicle. The processor 140 may determine an operation associated with platooning. The processor 140 may use the information calculated by a leader vehicle of the platooning or may determine the order that a vehicle is traveling when the vehicle is a leader vehicle which controls the entire platooning.

A V2X communication module 210 of FIG. 2 may communicate with the communication device 110 in the vehicle or may communicate with an external information transceiver 211 outside the vehicle or a platooning vehicle. The V2X communication module 210 may be implemented with a hardware device implemented with various electronic circuits for transmitting and receiving a signal through a wireless or wired connection. Furthermore, the V2X communication module 210 may deliver external information received over a wireless network from the external information transceiver 211 to a platooning controller 100 in the vehicle or may transmit information necessary for platooning to the external information transceiver 211 outside the vehicle. Communication technology, such as third generation/long term evolution (3G/LTE), as well as short range communication technology, such as wireless access in vehicular environments/dedicated short range communications (WAVE/DSRC), may be used as wireless network technology. In this embodiment, the external information transceiver 211 may be a device which transmits and receives road traffic information and information of an external vehicle. The external information transceiver 211 may be collectively called a terminal capable of performing transmission and reception based on V2X communication specifications and processing transmission and reception of data associated with V2X. The external information transceiver 211 may be included in an external infrastructure or the external vehicle.

A battery sensor module 220 of FIG. 2 may monitor a state of a battery 221 of FIG. 2. In other words, the battery sensor module 220 may monitor a voltage state of the battery 221 and may monitor an amount of current input and output from the battery 221. The battery sensor module 220 may detect a temperature of the battery 221 and may calculate a charging state using a voltage/current/temperature of the battery 221, thus providing information about the calculated charging state to the platooning controller 100. In this embodiment, the battery 221 may be a device which accumulates electricity for the starting or behavior of the vehicle and may be a lead acid battery, a Li-ion battery, or the like. There is a plurality of batteries depending on the characteristics of the vehicle.

An autonomous sensor module 230 of FIG. 2 may be configured to detect a situation around the vehicle or to detect a nearby vehicle. The autonomous sensor module 230 may include a plurality of sensors. The plurality of sensors may obtain information associated with a location of the external object, a speed of the external object, a movement direction of the external object, and/or a type (e.g., a vehicle, a pedestrian, a bicycle, a motorcycle, or the like) of the external object. For example, the autonomous sensor module 230 may include a radar, a camera, a laser scanner, a corner radar, and a radar capable of detecting information about the vehicle and the nearby vehicle such as location, speed, and acceleration. The autonomous sensor module 230 may also include a light detection and ranging (LiDAR), an acceleration sensor, a yaw rate sensor, a torque sensor, a wheel speed sensor, and/or the like.

A navigation device 240 of FIG. 2 may provide location information, map information, information about a road where the vehicle is traveling, and the like to the platooning controller 100. The road information may include road type, weather, temperature, traffic information, and the like.

The engine 250 for transmitting a driving force to the vehicle using fuels, the motor 260 for transmitting a driving force to the vehicle using the battery 221, the braking device 270 for controlling stopping of the vehicle, and the steering device 280 for controlling a driving direction of the vehicle may be normal components and may be controlled and driven by the processor 140 in an embodiment of the present disclosure.

In an embodiment of the present disclosure, the platooning controller 100 may share energy state information between platooning vehicles, may monitor an energy state necessary for a destination point of each platooning vehicle, and may adjust a platoon formation while platooning. Therefore, in this embodiment, the platooning controller 100 may increase the entire cruising range of the platooning vehicles and may minimize the number of fueling and charging needed for the platooning vehicles, thus minimizing the entire movement time of the platooning vehicles.

Furthermore, in an embodiment of the present disclosure, the platooning controller loaded into the leader vehicle monitors the energy state of each platooning vehicle and adjusts the platoon formation. However, embodiments are not limited thereto. For example, a platooning controller may be implemented as a separate server rather than being installed in a leader vehicle.

Figure 7:
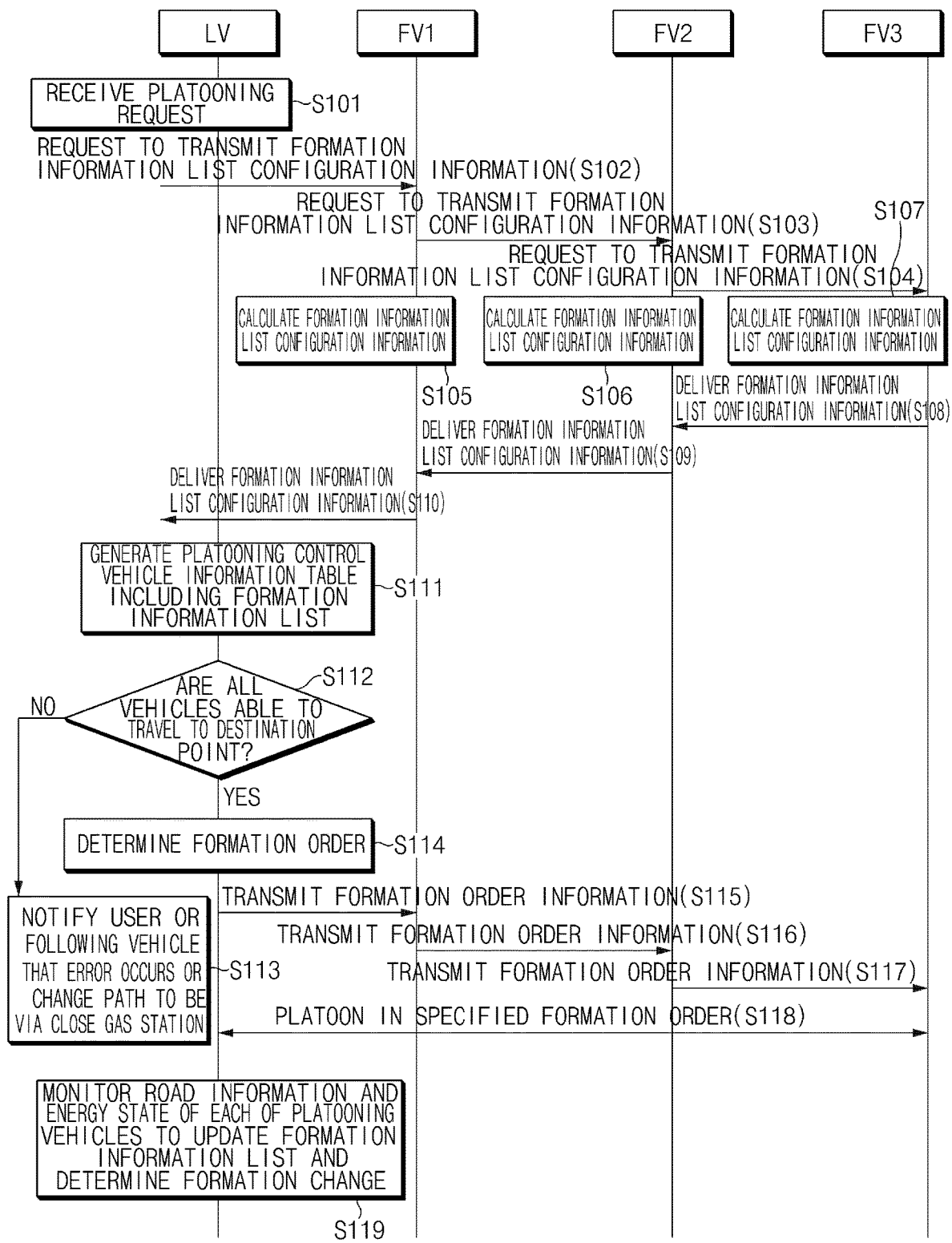
FIG. 7 is a signal sequence diagram illustrating a platooning control method among platooning vehicles according to an embodiment of the present disclosure.

Hereinafter, a platooning control method between platooning vehicles according to an embodiment of the present disclosure is described with reference to FIG. 7. FIG. 7 is a signal sequence diagram illustrating a platooning control method among platooning vehicles according to an embodiment of the present disclosure. Hereinafter, it is assumed that a platooning controller 100 loaded into a leader vehicle LV of FIG. 1 performs the process of FIG. 7. Moreover, it may be understood that the method performed by the platooning controller 100 depicted in FIG. 7 is being controlled by a processor 140 of the platooning controller 100.

When receiving a platooning request in operation S101, in operations S102, S103, and S104, the platooning controller 100 loaded into the leader vehicle LV may request the following vehicles FV1, FV2, and FV3 to transmit the formation information list configuration information. Thus, in operations S105, S106, and S107, each of the following vehicles FV1, FV2, and FV3 may calculate the formation information list configuration information. In operations S108, S109, and S110, the following vehicles FV1, FV2, and FV3 may transmit the formation information list configuration information to the leader vehicle LV. In this embodiment, platooning may be requested, and the leader vehicle LV may be configured so that the plurality of vehicles receive a request for platooning from outside information or from directly input information.

Thus, in operation S111, the platooning controller 100 loaded into the leader vehicle LV may configure a formation information list using the formation information list configuration information received from each of the following vehicles FV1, FV2, and FV3 and may generate a platooning control vehicle information table including the formation information list. In this embodiment, the platooning controller 100 loaded into the leader vehicle LV may first generate a platooning control vehicle information table 311 of FIG. 3 and may generate a formation information list with blank values. When receiving the formation information list configuration information received from each of the following vehicles FV1, FV2, and FV3, the platooning controller 100 may complete the platooning control vehicle information table 311 by filling the blank line information list with values.

Thereafter, in operation S112, the platooning controller 100 loaded into the leader vehicle LV may determine whether all the platooning vehicles are able to travel to a destination point. In other words, the platooning controller 100 loaded into the leader vehicle LV may compare the distance necessary to complete the remaining distance with the drivable distance. Herein, a vehicle is unable to travel to the destination point when the distance necessary to complete the remaining distance is longer than the drivable distance. In this embodiment, in operation S113, the platooning controller 100 loaded into the leader vehicle LV may notify a user or a manager who participates in the platooning, or a platooning controller of a following vehicle which participates in the platooning that an error may have occurred. Alternatively, the leader vehicle may change the path to be close to a gas station (charging station) and may supply energy to a platooning vehicle to increase the drivable distance. In this embodiment, when it is required to supply energy to all the plurality of the platooning vehicles, the platooning controller 100 loaded into the leader vehicle LV may determine whether the energy supply sources of the plurality of platooning vehicles are the same. When the energy supply sources differ from each other, the platooning controller 100 loaded into the leader vehicle LV may change the destination point with respect to the vehicle with the shortest drivable distance.

When all the platooning vehicles are able to travel to the destination point, in operation S114, the platooning controller 100 loaded into the leader vehicle LV may determine a formation order based on the drivable distance. In operations S115, S116, and S117, the platooning controller 100 loaded into the leader vehicle LV may transmit formation order information to each of the following vehicles FV1, FV2, and FV3. Thus, in operation S118, the platooning vehicles may perform platooning in the determined formation order.

In operation S119, the platooning controller 100 loaded into the leader vehicle LV may continue monitoring road information and the energy state of each of the platooning vehicles to update the formation information list and determine a formation change.

Figure 8:
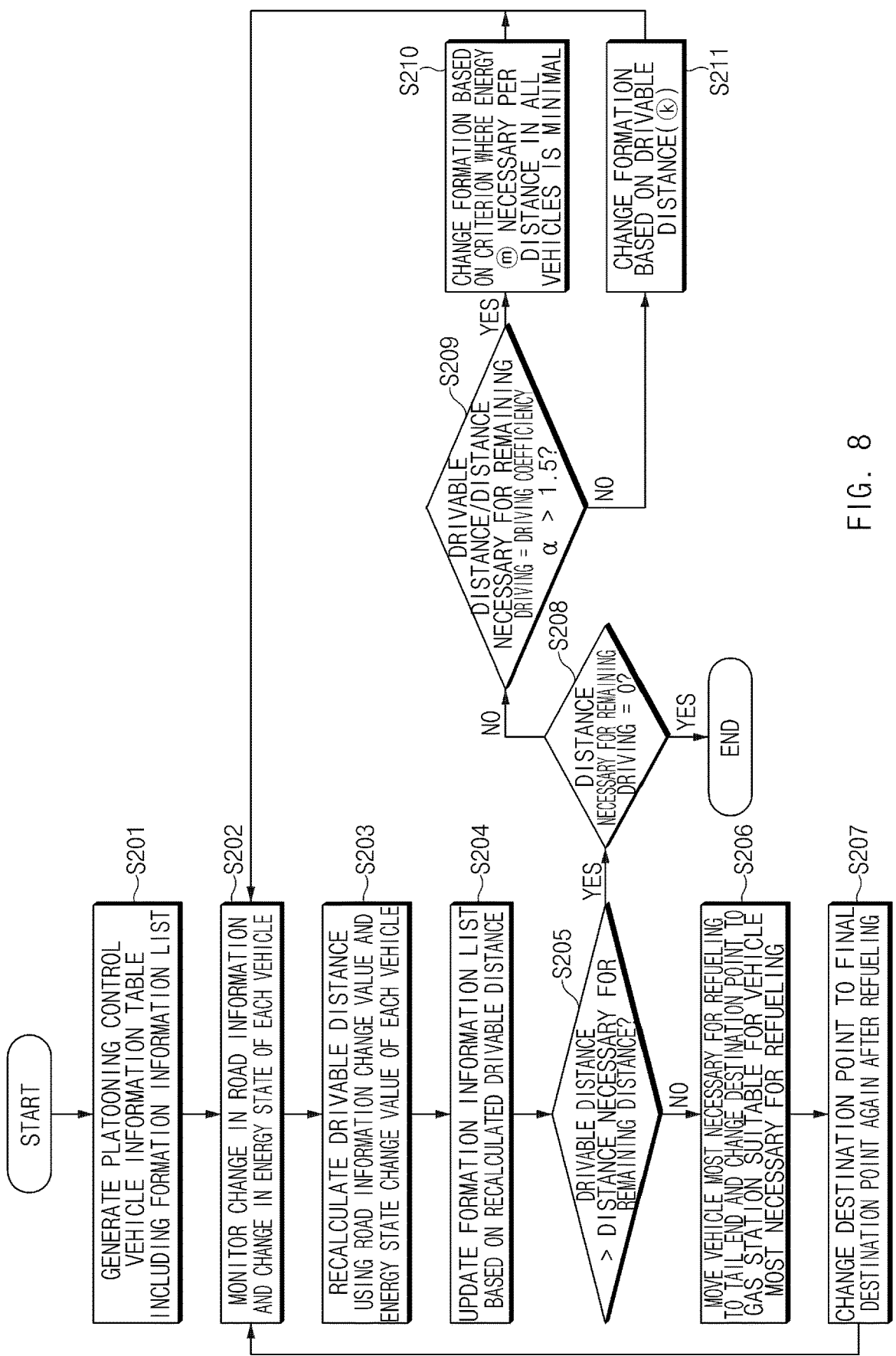
FIG. 8 is a flowchart illustrating a detailed platooning control method of a platooning controller according to an embodiment of the present disclosure.

Hereinafter, a platooning control method of a platooning controller according to an embodiment of the present disclosure is described in detail with reference to FIG. 8. FIG. 8 is a flowchart illustrating a detailed platooning control method of a platooning controller according to an embodiment of the present disclosure. Hereinafter, it is assumed that the process depicted in FIG. 8 is performed by a platooning controller 100 loaded into a leader vehicle LV of FIG. 1. Moreover, it may be understood that the method performed by the platooning controller 100 depicted in FIG. 8 may be controlled by a processor 140 of the platooning controller 100.

In operation S201, the platooning controller 100 loaded into the leader vehicle LV may generate a platooning control vehicle information table including a formation information list. In this embodiment, the platooning control vehicle information table may be identical to a platooning control vehicle information table 311 of FIG. 3. Additionally, the formation information list may be the same as a formation information list 313 of FIG. 3.

Platooning vehicles may platoon based on the generated platooning control vehicle information table. In operation S202, the platooning controller 100 loaded into the leader vehicle LV may monitor a change in road information and a change in the energy state of each vehicle while driving.

When the change in the road information or the change in the energy state of each vehicle occurs, in operation S203, the platooning controller 100 loaded into the leader vehicle LV may recalculate a drivable distance using a road information change value or the energy state change value of each vehicle. A drivable distance is recalculated in the same way as the formation information list 413 based on road information in a road information table 412 of FIG. 4.

In operation S204, the platooning controller 100 loaded into the leader vehicle LV may update a formation information list based on the recalculated drivable distance. In operation S205, the platooning controller 100 loaded into the leader vehicle LV may determine whether the drivable distance is greater than the distance necessary for the remaining driving.

When the drivable distance is less than or equal to the distance necessary for the remaining driving, in operation S206, the platooning controller 100 loaded into the leader vehicle LV may move the vehicle with the biggest need for refueling to the tail end of the platooning vehicles and may change the destination point to a gas station suitable for the vehicle with the biggest need for refueling. Although the distance necessary for the remaining driving, described in the platooning control vehicle information table 511 of FIG. 5, is 340 km, the drivable distance of a third vehicle FV2, described in the formation information list 512, is 300 km. Thus, the drivable distance of the third vehicle FV2 is shorter than the distance necessary for the remaining driving.

In operation S207, the platooning controller 100 loaded into the leader vehicle LV may change the destination point to the final destination point again after refueling and may control to continue platooning.

When the drivable distance is greater than the distance necessary for the remaining driving, in operation S208, the platooning controller 100 loaded into the leader vehicle LV may determine whether the distance necessary for the remaining driving is "0". When the distance necessary for the remaining driving is not "0", in operation S209, the platooning controller 100 loaded into the leader vehicle LV may determine whether a drivable coefficient a obtained by dividing the drivable distance by the distance necessary for the remaining driving is greater than a predetermined reference value. Herein, the reference value may be set to, but is not limited to, 1.5. Although the distance necessary for the remaining driving, described in the platooning control vehicle information table 511 of FIG. 5, is 340 km, the drivable distances of the respective vehicles, shown in a formation information list of FIG. 5, are 780 km, 750 km, 740 km, and 700 km. Thus, the drivable distances of the respective vehicles are greater than the distance necessary for the remaining driving. Particularly, in the formation information list 513 of FIG. 5, the drivable coefficient a is greater than 1.5. When all the drivable distances of the vehicles are greater than the distance necessary for the remaining driving, in other words, when the energy of all the vehicles is sufficiently high, the platooning controller 100 loaded into the leader vehicle LV may arrange the vehicles in the order in which the energy ⓜ necessary per distance is higher in efficiency. Alternatively, the platooning controller 100 may arrange the vehicles such that the sum of the energy necessary per distance in all vehicles is the lowest value, using a strategy to minimize total energy consumption. A condition where the vehicle energy is sufficiently determined may be defined as a drivable coefficient α using a drivable distance (k)/a distance ⓒ necessary for remaining driving and may be over 1.5. In this embodiment, the drivable coefficient α is not limited to 1.5 and may be changed anytime by an experimental value.

When the drivable coefficient α is less than or equal to the predetermined reference value, in operation S211, the platooning controller 100 loaded into the leader vehicle LV may change a platoon formation based on the drivable distance. When the drivable coefficient α is greater than the predetermined reference value, in operation S210, the platooning controller 100 loaded into the leader vehicle LV may change a platoon formation based on a criterion where energy necessary per distance in all vehicles is minimal. Since a cruising range of vehicles decreases upon a frequent line change, the platooning controller 100 loaded into the leader vehicle LV may use a reference value including a margin value (e.g., when the drivable distance is greater than or equal to 5 km).

Figure 9:
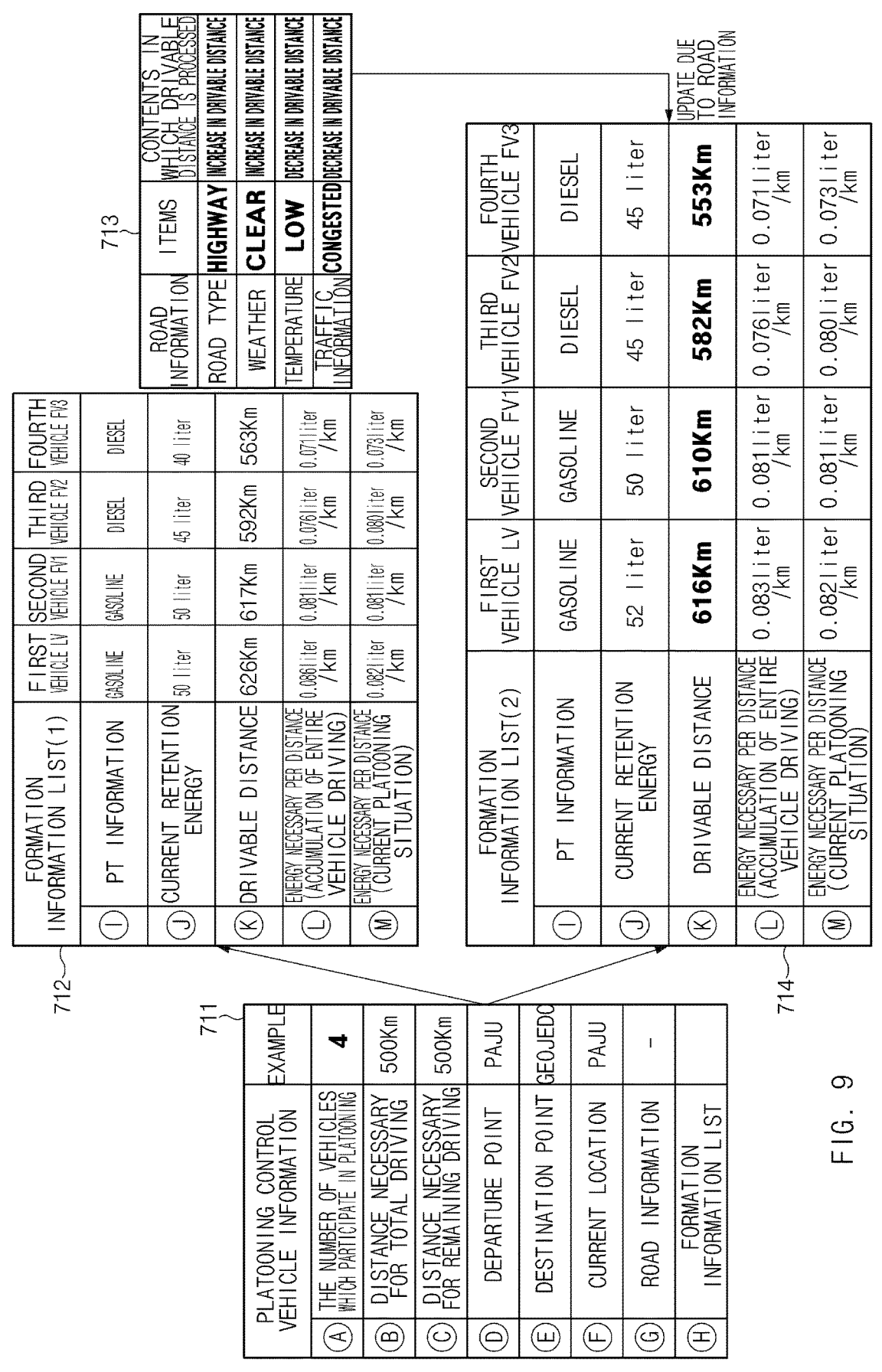

FIG. 9 is a drawing illustrating a platooning control vehicle information table of a platooning controller according to an embodiment of the present disclosure. FIG. 9 depicts an initially generated platooning control vehicle information table 711 and a formation information list (1) 712 containing detailed information. In this embodiment, an initial drivable distance before the vehicles travel may be calculated by dividing the current retention energy ⓙ by the energy ⓛ necessary per distance based on accumulation of the entire vehicle driving. A formation information list (2) 714 may disclose an example of recalculating a drivable distance using a road information table 713.

FIG. 10 is a drawing illustrating an example of increasing a vehicle cruising range of a platooning controller of FIG. 9. Referring to FIG. 10, after generating a platooning control vehicle information table 711 of FIG. 9 at the beginning before vehicles start to travel, platooning starts to change the current locations of the vehicles, and a platooning controller 100 of FIG. 2 may update a platooning control vehicle information table 811. In this embodiment, the platooning control vehicle information table 811 depicts that a distance necessary for the remaining driving and the current location may be changed due to driving. As such, when the vehicles travel, current retention energy may be changed. Additionally, the drivable distance may be changed, such as the formation information list (3) 812. In this embodiment, a drivable distance after the vehicles travel may be calculated by dividing the current retention energy ⓙ by the energy ⓜ necessary per distance based on the accumulation of the entire vehicle driving.

Thus, a second vehicle FV1 with the longest drivable distance may change to a leading vehicle in formation, and a first vehicle LV may move to the location of the second vehicle FV1. A formation information list (4) 813 may be an example of recalculating the energy necessary per distance based on the current platooning situation and the drivable distance since the formation has changed. In other words, when the second vehicle FV1 changes to the leader vehicle, the energy necessary per distance may be increased when the second vehicle FV1 travels as a first vehicle than when the second vehicle FV1 travels as the second vehicle. Thus, a drivable distance may decrease due to the increase in energy necessary per distance in a vehicle specified as the leader vehicle.

An embodiment of the present disclosure may increase a cruising range of all the platooning vehicles by preventing a platooning function from being released due to deterioration in the energy state of a specific vehicle. Furthermore, an embodiment of the present disclosure may minimize a movement time of all the platooning vehicles by minimizing the number of fueling or refueling and charging a vehicle. Moreover, an embodiment of the present disclosure may minimize costs for platooning using a strategy to minimize the driving energy when the drivable distance is longer than the distance necessary for driving.

In addition, in an embodiment of the present disclosure, a drivable distance of the platooning vehicles is calculated to adjust a platoon formation. However, embodiments are not limited thereto. For example, a platoon formation may be adjusted using remaining fuel and remaining battery capacity.

Figure 11:
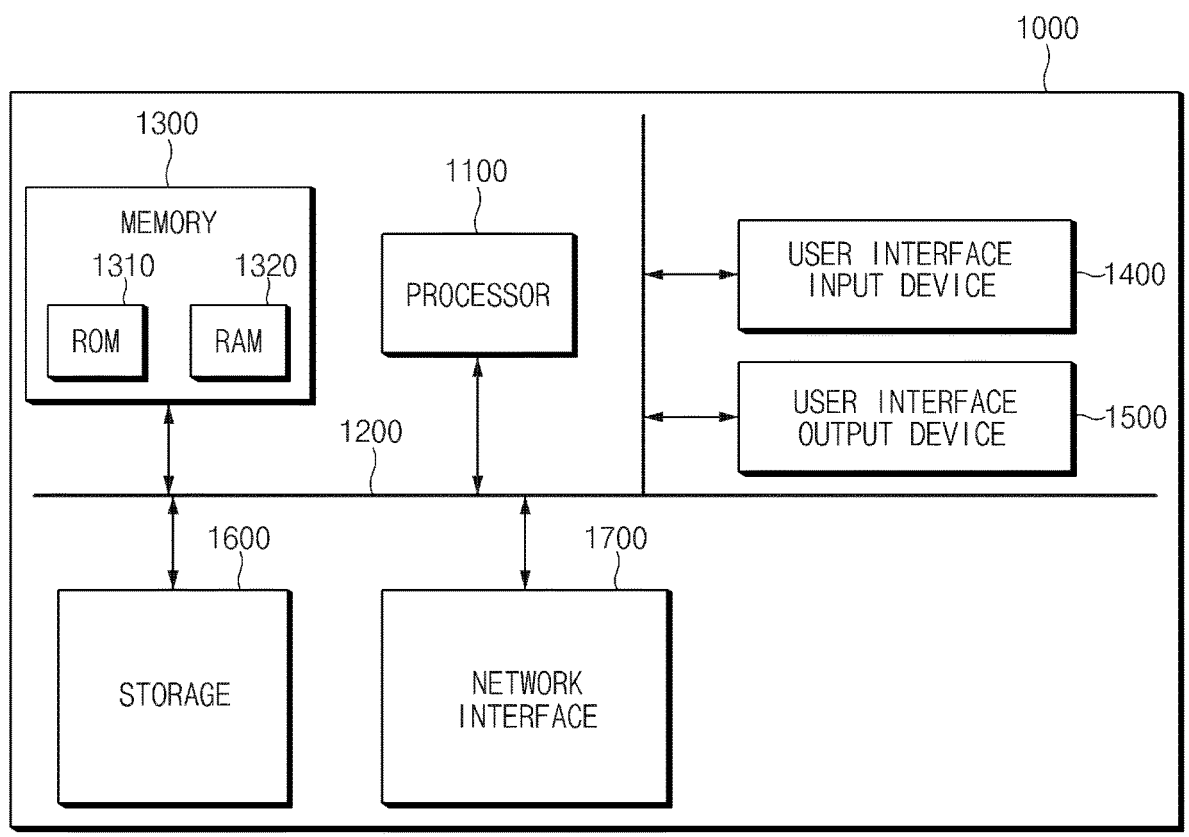
FIG. 11 is a block diagram illustrating a configuration of a computing system according to an embodiment of the present disclosure.

FIG. 11 is a block diagram illustrating a configuration of a computing system according to an embodiment of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

A storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as a separate component of the user terminal.

The technology of the present disclosure may increase the entire cruising range of platooning vehicles by adjusting a platoon formation based on a change in the energy state between the platooning vehicles and may minimize a movement time of all platooning vehicles by minimizing energy supplied to the platooning vehicles and the number of supplying energy to the platooning vehicles.

In addition, various effects directly or indirectly ascertained through the present disclosure may be provided.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

What is claimed is:

1. A platooning controller comprising: a processor configured to control platooning based on platooning control vehicle information when platooning vehicles, including one leader vehicle and at least one or more following vehicles, are traveling, to monitor information associated with an energy state of each of the platooning vehicles while platooning, and to adjust a platoon formation based on a change in the energy state of each of the platooning vehicles; and a storage configured for storing information obtained to adjust the platoon formation by the processor, wherein the processor is further configured to, for each of the platooning vehicles: accumulate a total driving distance by the platooning vehicle by adding a driving distance to the total driving distance accumulated over the total driving history of the life of the vehicle whenever the the vehicle is driven and store the accumulated total driving distance in the storage; before the platooning starts, retrieve the accumulated total driving distance from the storage and calculate an energy required per a predetermined distance based on the accumulated total driving distance; calculate a remaining energy based on the remaining fuel of the platooning vehicle; calculate a drivable distance of the platooning vehicle by dividing the remaining energy of the platooning vehicle and the energy required per the predetermined distance; after the platooning starts, recalculate the drivable distance of the platooning vehicle using the remaining energy of the platooning vehicle and the energy required per the predetermined distance based on a current platooning situation of the platooning vehicle; and compare the drivable distance calculated for the platooning vehicle with the remaining distance to the destination point; wherein the processor is further configured to, when the drivable distance for at least one of the platooning vehicles is longer than the remaining distance to the destination point, move each of the platooning vehicles to adjust the platoon formation based on the drivable distance of each of the platooning vehicles.

2. The platooning controller of claim 1, wherein the processor is configured to, when loaded into the one leader vehicle, generate a platooning control vehicle information table including the platooning control vehicle information collected from the at least one or more following vehicles and the platooning control vehicle information of the leader vehicle.

3. The platooning controller of claim 2, wherein the platooning control vehicle information table comprises the number of the platooning vehicles which participate in platooning, a starting distance to the destination point, the remaining distance to the destination point, a source point, the destination point, a current location, road information and a formation information list.

4. The platooning controller of claim 3, wherein the formation information list comprises at least one or more of vehicle fuel information for each of the platooning vehicles, current remaining energy information for each of the platooning vehicles, the drivable distance for each of the platooning vehicles, the energy required per the predetermined distance based on the accumulated total driving distance for each of the platooning vehicles, and the energy required per the predetermined distance based on the current platooning situation for each of the platooning vehicles.

5. The platooning controller of claim 4, wherein the road information comprises at least one or more of a road type, weather, temperature, and traffic information.

6. The platooning controller of claim 1, wherein the processor is configured to:
when loaded into at least one or more following vehicles, transmit the platooning control vehicle information, including the drivable distance of the following vehicle, vehicle fuel information of the following vehicle, the remaining energy of the following vehicle, and the energy required per the predetermined distance based on the accumulated total driving distance, to the leader vehicle when receiving a request to transmit the platooning control vehicle information from the leader vehicle.

7. The platooning controller of claim 1, wherein the processor is configured to:
compare the drivable distance of each of the platooning vehicles; and
determine the platoon formation based on the drivable distance of each of the platooning vehicles.

8. The platooning controller of claim 1, wherein the processor is configured to:
monitor a change in road information; and
recalculate the drivable distance of each of the platooning vehicles based on the change in road information.

9. The platooning controller of claim 1, wherein the processor is configured to:
when loaded into the one leader vehicle, compare the drivable distance recalculated for each of the platooning vehicles with the remaining distance to the destination point; and
when there is a vehicle where the recalculated drivable distance is shorter than the remaining distance to the destination point, move the vehicle where the recalculated drivable distance is shorter than the remaining distance to the destination point to the tail end of the platoon formation and provide a path to a place for energy supply to the vehicle where the recalculated drivable distance is shorter than the remaining distance to the destination point.

10. The platooning controller of claim 1, wherein the processor is further configured to:
when loaded into the one leader vehicle, compare the drivable distance recalculated for each platooning vehicle with the remaining distance to the destination point; and
adjust the platoon formation based on the drivable distance, when the drivable distance recalculated for each platooning vehicle is longer than the remaining distance to the destination point.

11. The platooning controller of claim 10, wherein the processor is configured to:
determine whether a drivable coefficient obtained by dividing the drivable distance recalculated for each of the platooning vehicles by the remaining distance to the destination point is greater than or equal to a predetermined reference value; and
adjust the platoon formation based on an order in which the energy required per the predetermined distance based on the current platooning situation of each of the platooning vehicles is minimal, when the drivable coefficient is greater than or equal to the reference value.

12. The platooning controller of claim 11, wherein the processor is configured to:
adjust the platoon formation in the order that the drivable distance recalculated for each of the platooning vehicles is longer, when the drivable coefficient is less than the reference value.

13. A vehicle system comprising: a vehicle-to-everything (V2X) communication module configured to perform communication between platooning vehicles, when the platooning vehicles, including one leader vehicle and at least one or more following vehicles, are traveling; and a platooning controller configured to control platooning based on platooning control vehicle information transmitted and received between the platooning vehicles, monitor information associated with an energy state of each of the platooning vehicles while platooning, and adjust a platoon formation based on a change in the energy state of each of the platooning vehicles, wherein the platooning controller is further configured to, for each of the platooning vehicles: accumulate a total driving distance by the platooning vehicle by adding a driving distance to the total driving distance accumulated over the total driving history of the life of the vehicle whenever the vehicle is driven and store the accumulated total driving distance in the storage; before the platooning starts, retrieve the accumulated total driving distance from the storage and calculate an energy required per a predetermined distance based on the accumulated total driving distance; calculate a remaining energy based on the remaining fuel of the platooning vehicle; calculate a drivable distance of the platooning vehicle by dividing the remaining energy of the platooning vehicle and the energy required per the predetermined distance, after the platooning starts, recalculate the drivable distance of the platooning vehicle using the remaining energy of the platooning vehicle and the energy required per the predetermined distance based on a current platooning situation of the platooning vehicle; and compare the drivable distance calculated for the platooning vehicle with the remaining distance to the destination point; wherein the platooning controller is further configured to, when the drivable distance for at least one of the platooning vehicles is longer than the remaining distance to the destination point, move each of the platooning vehicles to adjust the platoon formation based on the drivable distance of each platooning vehicle.

14. A platooning control method, the method comprising the steps of: receiving platooning control vehicle information from at least one or more following vehicles, when platooning vehicles, including one leader vehicle and the at least one or more following vehicles, are traveling; determining a platoon formation based on the received platooning control vehicle information and platooning control vehicle information of each of the platooning vehicles; monitoring information associated with an energy state of each of the platooning vehicles while platooning; and adjusting the platoon formation based on a change in the energy state of each of the platooning vehicles, wherein the monitoring information comprises, for each of the platooning vehicles: accumulating a total driving distance by the platooning vehicle by adding a driving distance to the total driving distance accumulated over the total driving history of the life of the vehicle whenever the vehicle is driven and storing the accumulated total driving distance in the storage; before the platooning starts, retrieving an accumulated total driving distance from the storage and calculating an energy required per a predetermined distance based on the accumulated total driving distance; calculating a remaining energy based on the remaining fuel of the platooning vehicle; and calculating a drivable distance using the remaining energy of the platooning vehicle and the energy required per the predetermined distance, and wherein the adjusting of the platoon formation comprises: after the platooning starts, recalculating the drivable distance of each of the platooning vehicles using the remaining energy of each of the platooning vehicles and the energy required per the predetermined distance based on a current platooning situation of each of the platooning vehicles; comparing the drivable distance recalculated for each of the platooning vehicles with the remaining distance to a destination point; and when the drivable distance for at least one of the platooning vehicles is longer than the remaining distance to a destination point, move each of the platooning vehicles to adjust the platoon formation based on the drivable distance of each of the platooning vehicles.

15. The method of claim 14, wherein the determining of the platoon formation comprises:
determining the platoon formation based on a drivable distance of each of the platooning vehicles.

16. The method of claim 15, wherein the adjusting of the platoon formation comprises:
when there is a vehicle where the recalculated drivable distance is shorter than the remaining distance to the destination point, moving the vehicle where the recalculated drivable distance is shorter than the remaining distance to the destination point to the tail end of the platoon formation and providing a path to a place for energy supply to the vehicle where the recalculated drivable distance is shorter than the remaining distance to the destination point.

17. The method of claim 16, wherein the adjusting of the platoon formation further comprises:
when the drivable distance recalculated for each platooning vehicle is longer than the remaining distance to the destination point, determining whether a drivable coefficient obtained by dividing the drivable distance recalculated for each platooning vehicle by the remaining distance to the destination point is greater than or equal to a predetermined reference value.

18. The method of claim 17, wherein the adjusting of the platoon formation further comprises:
adjusting the platoon formation based on an order in which the energy required per the predetermined distance based on a current platooning situation of each of the platooning vehicles is minimal, when the drivable coefficient is greater than or equal to the reference value; and
adjusting the platoon formation in the order that the drivable distance recalculated for each platooning vehicle is longer, when the drivable coefficient is less than the reference value.

* * * * *